W. W. Ballard & B. B. Waddell,
Wood Pavements.
N° 94,063.                                                          Patented Aug. 24, 1869.
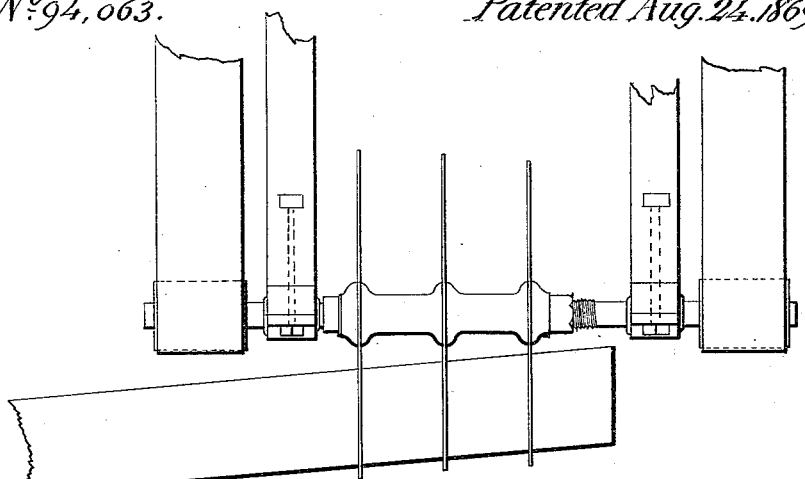
Fig. 1.
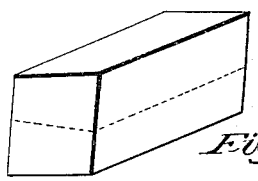
Fig. 2.
Fig. 3.
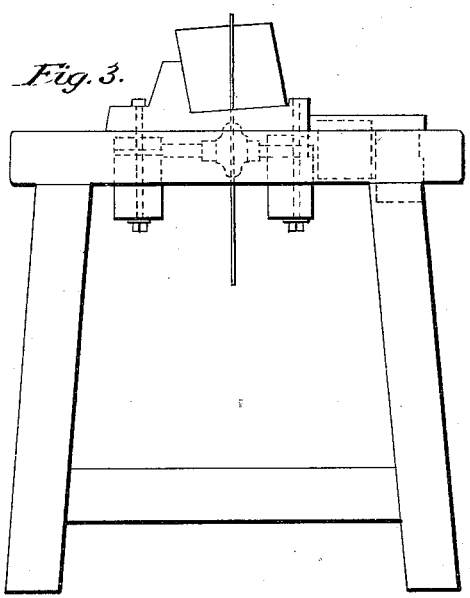
Fig. 4.
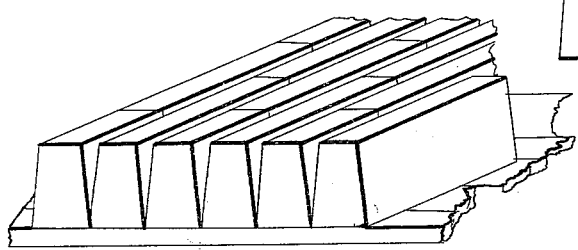
Attest:
E. Sherman
Ben. A. Shepherd
Inventor:
Wm. W. Ballard
Burvin B. Waddell

UNITED STATES PATENT OFFICE.

WILLIAM W. BALLARD, OF ELMIRA, NEW YORK, AND BUREN B. WADDELL, OF MEMPHIS, TENNESSEE; BUREN B. WADDELL ASSIGNS ALL HIS RIGHT TO WILLIAM W. BALLARD.

IMPROVED MODE OF CUTTING BLOCKS FOR WOOD PAVEMENT.

Specification forming part of Letters Patent No. 94,063, dated August 24, 1869.

*To all whom it may concern:*

Be it known that we, W. W. BALLARD, of Elmira, Chemung county, New York, and B. B. WADDELL, of Memphis, Shelby county, Tennessee, have invented an Improved Mode of Cutting Blocks for Street-Pavement; and we do hereby declare that the following is a full, clear, and exact description of the same, reference being had to the accompanying drawings, which are made a part of this specification.

Figure 1 represents the lumber, as the blocks are being cut off, in order to give the ends of the blocks the proper angle or bevel. Fig. 2 represents the blocks after being cut off, as above described, before splitting. Fig. 3 represents the blocks in the act of being split on a saw-table, showing the rest or guide necessary to cut them in the proper direction. Fig. 4 represents the blocks finished and placed in the pavement.

Our invention consists in a novel method of cutting and splitting blocks for wood pavement, in such a manner that two cuts, or rather one cut and one splitting, will produce two finished blocks with level top and bottom, and two sides beveled, one being with the grain and the other slightly oblique to the grain, without more waste of timber than is occasioned by the saws.

We take a piece of lumber four and a half feet long, twelve inches wide, and seven inches thick. This is placed under the saws, as shown in Fig. 1, in an inclined position, so that the first cut will produce blocks with two sides inclined, the top and bottom level, or in parallel planes. The first cut produces nine blocks, such as shown in Fig. 2, out of a piece of lumber as described above; each such block will then be twelve inches long, six inches high with the fiber, and seven inches wide across the fiber. These blocks are then split, as indicated in dotted lines, Fig. 2, slightly oblique to the fiber, as seen also in Fig. 3, being brought toward the splitting-saw in an inclined position, inclined in contradistinction to a position level at top and bottom, in such a manner that the line of the cut will form the other two beveled sides of two blocks, each of which has the top and bottom level, or in parallel planes, and the sides beveled, as shown in Fig. 4, and, moreover, has the grain running in the direction of one of the beveled sides, as clearly shown in Figs. 2 and 3. These blocks will then be twelve inches long, six inches high, three inches wide at the top, and four inches wide at the base.

The figures of feet and inches we have, of course, used only as an illustration, as different dimensions of lumber may be used; but those given will do for an ordinary street-block.

The two great advantages of this method are economy of lumber and of labor and time, the only loss of lumber being the small pieces cut off at each end to start the bevel; each two cuts, or rather one cut and one splitting, produces two complete blocks ready for use.

Having thus described our invention, what we desire to secure by Letters Patent is—

The herein-described method of cutting blocks for wooden pavement, so as to form by two cuts, or one cut and one splitting, two finished blocks with the top and bottom level, or in parallel planes, and the sides beveled, one side being inclined with the fiber, and without waste of material, substantially as set forth.

WM. W. BALLARD. [L. S.]
BUREN B. WADDELL. [L. S.]

Witnesses:
E. SHERMAN,
BEN. A. SHEPHERD.